July 24, 1962    H. H. RAUH    3,045,919
THERMOSTATICALLY CONTROLLED FLUID VALVE
Filed Jan. 14, 1960    2 Sheets-Sheet 1
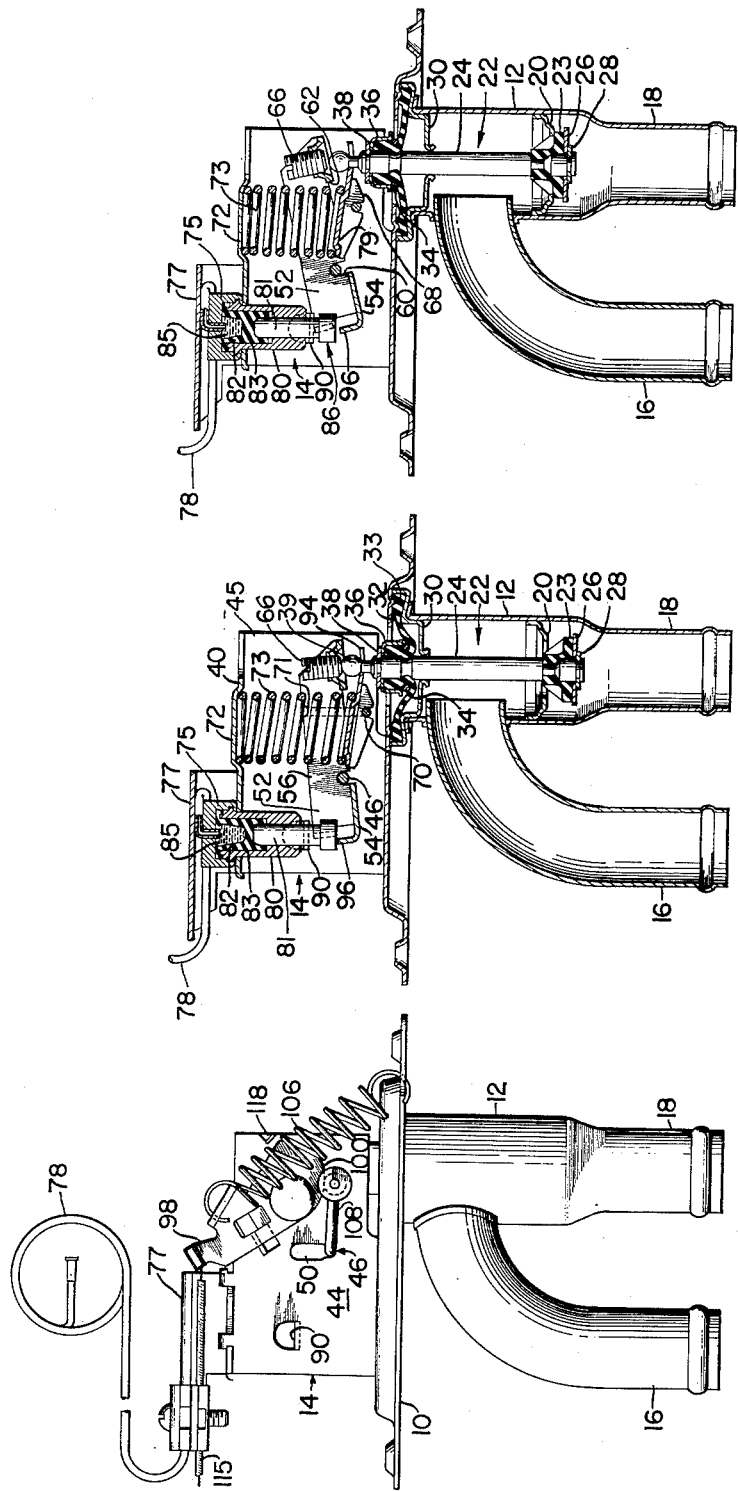

United States Patent Office 3,045,919
Patented July 24, 1962

3,045,919
THERMOSTATICALLY CONTROLLED
FLUID VALVE
Herbert H. Rauh, Greensburg, Pa., assignor to Robertshaw-Fulton Controls Company, Richmond, Va., a corporation of Delaware
Filed Jan. 14, 1960, Ser. No. 2,429
2 Claims. (Cl. 236—99)

This invention relates to thermostatically controlled fluid valves and, more particularly, to a thermostatically controlled valve adapted to control the flow of fluid to a heat exchanger. This invention has particular but by no means exclusive utility when used for controlling the flow of fluid through a heat exchanger for heating the air inside the passenger compartment of an automobile to maintain the temperature within the passenger compartment at a selected temperature.

It is the primary object of the present invention to provide a thermostatically controlled fluid valve having an adjustable heat range.

Another object of the present invention is to provide improved limiting means for controlling the movement of the valve actuating mechanism.

Another object of the invention is to provide an improved power element operatively mounted to cooperate with the valve actuating mechanism during periods of use and to be operatively disassociated therefrom during periods of nonuse.

Another object is to provide improved calibration means wherein the adjustment of the device to its environment may be more easily accomplished.

Figure 4:
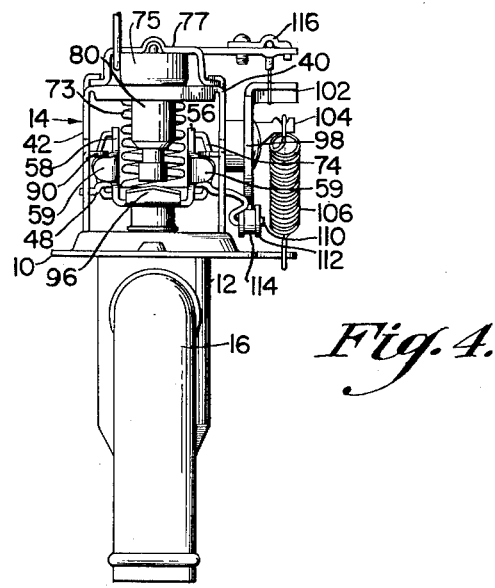
Figure 5:
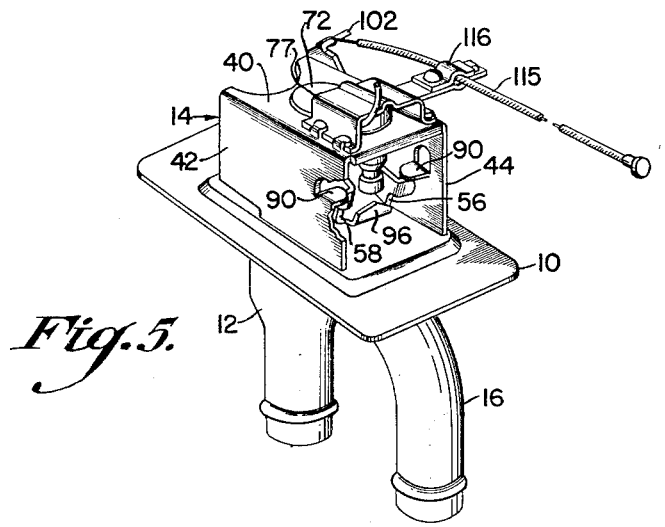

Other objects and advantages of the invention will become apparent from the following description taken in connection with the accompanying drawings wherein:

FIG. 1 is a view in side elevation;
FIG. 2 is a longitudinal section through the device of FIG. 1, showing the valve member in its open position;
FIG. 3 is a longitudinal section through the device of FIG. 1, showing the valve member in its closed position;
FIG. 4 is an end view in elevation; and
FIG. 5 is a perspective view with a portion of the housing broken away.

In the drawings, wherein like numerals are used to indicate corresponding parts throughout the various views, FIGS. 1 through 5 show a preferred embodiment wherein the thermostatically controlled fluid valve comprises a base plate 10 having a tubular valve housing 12 mounted on the underside thereof and a cover assembly 14 mounted on the upper side thereof. An inlet conduit 16 extends through a wall of the valve housing and is secured therein by soldering or the like. The valve housing is provided with an area of reduced diameter forming an outlet 18.

A valve seat 20 is disposed within the valve housing and secured thereto by soldering or the like. A valve member generally disclosed at 22 is also disposed within the housing 12 and adapted to move longitudinally of the housing to open and closed positions.

The valve member 22 comprises a head 23 mounted on a stem 24 by means of a washer 26 and a retaining ring 28. The stem 24 extends upwardly through a valve stem guide 30 and has mounted circumferentially thereon a diaphragm seal 32 sealingly held in position on the stem 24 by a seal spring 34, a seal cap 36, and a seal cap retaining ring 38. The stem extends further through an opening provided in the base plate and terminates at its upper end with a spherical head 39. The diaphragm seal 32 is provided with a bead portion 33 around its circumference and said bead portion is sealably retained between the valve stem guide 30 and the base plate 10.

The cover assembly 14 mounted on the upper side of the base plate 10 comprises a ceiling portion 40 and a pair of opposed sidewalls 42, 44. Extending between the sidewalls 42, 44 and supported thereby is a crank 46 provided with a single throw 48 formed intermediate its ends. Crank 46 projects through sidewalls 42, 44 as at apertures 50, and is supported within the apertures for pivotal movement about a horizontal axis extending traversely between the sidewalls with throw 46 disposed between sidewalls 42 and 44.

Pivotally mounted on the crank throw 48 is an adjusting beam 52. The adjusting beam comprises a floor portion 54 and a pair of oppositely disposed vertical wall members 56, 58. The wall members 56 and 58 are each provided with an earlike projection 59 formed at right angles to the longitudinal center line of the adjusting beam and extending outwardly therefrom, adapted to dispose the adjusting beam 52 centrally on the crank throw 48 and substantially equidistant from each of the opposed inside faces of the sidewalls 42 and 44 of the cover portion 14.

The adjusting beam member 52 is further provided with a pair of U-shaped notches 60 extending upwardly into the wall portions adapted to receive the crank throw 48 and to be journalled for pivotal movement thereabout. An open space 62 provided in the floor 54 of the adjusting beam 52 is adapted to receive one end of an overstroke link 68. A calibrating screw 66 is threadedly received in the adjusting beam adjacent one end thereof to provide adjustment of the adjusting beam 52 relative to the spherical head 39 of the valve stem 24 in accordance with the particular environmental conditions of the installation.

The adjusting beam 52 is further provided with an upturned abutment portion 96 adjacent one end and adapted to operatively engage the actuating pin 86 of the thermally responsive power element 75 to be hereinafter described. Thus, the adjusting beam may be adjusted to move the valve member 22 relative to its seat 20 when the thermally responsive fluid within the capillary tube 78 is at any given temperature. A lock nut (not shown) may be used to retain the adjusting screw in its adjusted position.

An overstroke link supporting substantially U-shaped bail 70 having its free ends turned inwardly is positioned with said free ends engaging a pair of slots 71 provided in the upper portion of the vertical walls of the adjusting beam and further adapted to support the overstroke link 68 in a suspended relationship beneath the adjusting beam 52. The bail 70 is formed with outwardly bowed vertical legs 74 as shown best in FIG. 4 and the extremities of the outwardly bowed portion are adapted to engage the opposed inside faces of the walls 42, 44 of the cover portion 14.

Thus, it may be seen that the adjusting beam 52 is so positioned within the housing and provided with the various aforementioned aligning means, that its engagement with the thermally responsive element 75 will be assured. Furthermore, the provision of the aligning earlike projections 56 and 58 adjacent one end of the adjusting beam 52 and the outwardly bowed legs 74 of the overstroke link supporting bail 70 adjacent the other end provide positive means to retain the adjusting beam 52 and its associated mechanism in alignment with the cover 14.

A spring seat 72 is positioned in the cover housing 14 to receive one end of a main spring 73. The other end of the main spring is seated around an annular flange 79 formed in the overstroke link 68. With the main spring 73 seated in this position, it can be readily seen that the main spring 73 provides a plurality of functions. In addition to biasing the overstroke link 68 in a counterclockwise direction, it will also bias the adjusting beam 52 in a clockwise direction and hold several of the components in assembled relationship.

The overstroke link 68 is urged in a counterclockwise direction about its supporting bail 70 and is provided with a V-shaped notch 94 terminating in a circular aperture at one end. The walls of the aperture are adapted to engage the lower surface of the spherical head 39 of the valve stem 24 providing a connection between the adjusting beam 52 and the valve stem 24.

The power assembly 75 is housed within a substantially U-shaped bracket 77 attached to the outer surface of the cover assembly 14. The ceiling portion 40 of the cover assembly 14 is provided with an aperture adapted to receive the cylindrical body portion 80 of the power assembly 75 and to position the power assembly 75 in operative engagement with the adjusting beam 52. The power assembly 75 comprises a cylindrical body portion 80 provided with an axial bore 81 in which is placed an actuating pin 86. A piston 82 mounted within the cylinder 83 actuates the pin 86 in response to the temperature responsive fluid 85 in a well known manner.

The power assembly 75 is so positioned with relation to the adjusting beam that when it is in its contracted state, that is, when it is cold, the thermally responsive fluid therein occupies the least volumetric area, the actuating pin will not be in engagement with the adjusting beam 52. The adjusting beam 52 will have rotated on its crank 46 in a clockwise direction unitl the earlike projections 59 on the beam contact the lugs 90 formed on the cover assembly 14, preventing further rotation of the adjusting beam 52.

A cam lever 98 is pivotally mounted on the sidewall 44 of the cover 14 and is provided with a cam surface 100, best shown in FIG. 1, at one end thereof and a lug 102 formed integrally therewith and at right angles thereto on the other end. A second lug 104 is formed adjacent the middle portion of the cam lever 98 and also extends at right angles thereto. A tension spring 106 is operatively connected at one end to the lug 104 and its other end is connected to the base plate 10, thereby biasing the cam lever 98 in the clockwise direction.

One end of the crank 46, as hereinbefore described, extends through the sidewall 44 of the cover assembly 14 and is provided with a right angular bent portion 108 extending substantially parallel of the wall 44 of the cover 14. At its extremity, the crank is provided with a small tang 110 at right angles to the cover assembly 14 and substantially parallel to the crank body. A roller 112, having a recessed portion 114 in its circumferential face, is rotatably mounted on the tang 110 for engagement with the cam surface 100 of the cam lever 98. An operating means, such as a Bowden wire 115, is supported by clamp 116 and operatively connected to the lug 102.

*Operation*

Referring to FIG. 3, the valve member 22 is shown in its closed position, permitting no fluid flow to the heat exchanger. It is noted that with the valve member 22 in this position, the cam lever 98 is rotated clockwise to engage its stop 118 and tension is relaxed on the spring 106. In this position of the cam lever 98, the right angled bent portion 108 of the crank 46 has been rotated clockwise about its pivot. Accordingly, the crank throw 48 on the crank 46 is rotated clockwise to elevate the adjusting beam 52 to its uppermost position, whereby the earlike projections 59 on the adjusting beam 52 will engage the lugs 90 on the walls of the cover member 14, thereby preventing further elevation of the left-hand end of adjusting beam as viewed in FIGS. 2 and 3 and assuring a positive seal of the valve head 23 against its seat 20. It is further noted that in this position the biasing force exerted on beam 52 by spring 73 is absorbed by the engagement between projections 59 and lugs 90, thereby releasing the biasing load applied to actuating pin 86 of power element 75 when the temperature of the thermally responsive fluid within the power element is below a temperature sufficient to urge pin 86 firmly into engagement with abutment 96. Accordingly, no pressure is placed on the power element by spring 73 during periods when the thermally responsive element is contracted.

Assume now that it is desired to open the valve and supply heat to the passenger compartment. If the atmospheric temperature is relatively warm, it will be necessary to supply only a limited amount of hot water to the heat exchanger to elevate the temperature of the outside air supplied to the passenger compartment. Accordingly, the control cable 115 is pulled to rotate the cam lever 98 a short distance in the counterclockwise direction. Rotation of the cam lever 98 imparts rotation to the crank 46 through the roller 112, thereby shifting the adjusting beam 52 downwardly, clockwise rotation being imparted to the adjusting beam by the force of the main spring 73. The downward movement of the adjusting beam 52 results in a corresponding downward movement of the overstroke link 68. The overstroke link being in operative engagement with the valve stem 24, also imparts a downward movement to the valve member 22, thereby moving it an increment of its stroke and out of engagement with its seat 20.

If the temperature of the air entering the passenger compartment should increase after the valve member 22 has been initially opened, the fluid in the thermally responsive element 75 will expand driving the piston 82 and the actuating pin 86 downwardly. The actuating pin will engage the abutment 96 on the adjusting beam 52 and rotate the adjusting beam 52 in a counterclockwise direction against the force of the main spring 73, moving the valve member 22 to a closed position against its seat 20. Thus, the air is supplied to the passenger compartment at a preselected temperature under automatic control to maintain that temperature.

If, on the other hand, the atmospheric temperature becomes relatively low, it becomes necessary to supply a greater volume of hot water to the heat exchanger to elevate the temperature of the air entering the passenger compartment. Under these conditions, the cam lever 98 is rotated a greater distance and valve member 22 is opened to allow a greater volume of hot water to pass through the valve and thus the air supplied to the passenger compartment will be at a much higher predetermined temperature and will be automatically controlled to maintain this higher predetermined temperature.

This invention, therefore, enables the occupant of the passenger compartment of a vehicle to select the heat range of the valve compatible with the atmospheric temperature by merely pushing or pulling the control cable 115 to vary the position of the cam lever 98. When the position of the cam has been changed, the valve will automatically maintain the temperature of the air entering the passenger compartment within the desired range.

While only one embodiment of the present invention has been shown and described herein, it will be apparent that various changes may be made in the form and arrangement of parts without departing from the scope of the invention as defined in in the appended claims.

I claim:

1. In a thermostatically controlled fluid valve comprising a valve housing having a fluid flow passage therethrough, valve means in said passage including a valve stem projecting vertically from said housing and operable to open or close said passage to the flow of fluid therethrough in accordance with the vertical position of said stem, a pair of spaced vertical sidewalls on said housing, an elongate control beam, means supporting said beam at a location intermediate its ends for pivotal movement between said sidewalls about a vertically adjustable horizontal axis extending transversely between said sidewalls, thermostatically responsive means including a pin mounted between said sidewalls above one end of said beam for thermally induced vertical movement, said pin being operable in response to a predetermined temperature increase to move downwardly in engagement with said one end of said beam to pivot said beam in a first direction about said axis, means coupling the other end of said beam to said stem to transmit to said stem vertical movement of said other end of said beam induced by pivotal movement of said beam about said axis or by vertical adjustment of said axis, said coupling means including resilient means biassing said beam in pivotal movement about said axis in the direction opposite to said first direction; the improvement comprising a pair of outwardly projecting ears on said beam adjacent said one end thereof engageable with said sidewalls to guide said one end of said beam in vertical movement between said sidewalls, means on said coupling means for guiding the other end of said beam in vertical movement between said sidewalls, and abutment means on said sidewalls engageable with said ears to define an end limit to upward movement of said one end of said beam to thereby absorb the load exerted on said pin of said thermostatically responsive means by said biassing means when the temperature sensed by said thermostatically responsive means is below a selected temperature.

2. In a thermostatically responsive valve assembly as defined in claim 1 wherein said means coupling said other end of said beam to said stem comprises an overshoot lever, a bail member pivotally mounted upon said control beam and pivotally supporting said overshoot lever upon said control beam; the further improvement wherein said means on said coupling means for guiding the other end of said beam comprises outwardly bowed portions on said bail member projecting transversely toward the adjacent sidewalls.

References Cited in the file of this patent
UNITED STATES PATENTS

| | | |
|---|---|---|
| 1,273,644 | Meacham | July 23, 1918 |
| 1,794,412 | McKibben | Mar. 3, 1931 |
| 1,992,377 | Landgraf | Feb. 26, 1935 |
| 2,855,152 | Tyler et al. | Oct. 7, 1958 |